US012675721B2

(12) United States Patent
Sandberg et al.

(10) Patent No.: US 12,675,721 B2
(45) Date of Patent: *Jul. 7, 2026

(54) QUBIT-SELECTIVE TUNING OF TWO-LEVEL SYSTEM IN SUPERCONDUCTING QUBITS VIA OPTICAL CONTROL

(71) Applicant: INTERNATIONAL BUSINESS MACHINES CORPORATION, Armonk, NY (US)

(72) Inventors: Martin O. Sandberg, Ossining, NY (US); Abram L. Falk, Port Chester, NY (US); Karthik Balakrishnan, Scarsdale, NY (US); Jason S. Orcutt, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 749 days.

This patent is subject to a terminal disclaimer.

(21) Appl. No.: 18/046,468

(22) Filed: Oct. 13, 2022

(65) Prior Publication Data

US 2024/0127096 A1     Apr. 18, 2024

(51) Int. Cl.
*G06N 10/00* (2022.01)
*G06N 10/40* (2022.01)

(52) U.S. Cl.
CPC .................................... *G06N 10/40* (2022.01)

(58) Field of Classification Search
CPC ............................... G06N 10/40; G06N 10/00
See application file for complete search history.

(56) References Cited

U.S. PATENT DOCUMENTS

| | | | |
|---|---|---|---|
| 6,800,837 | B1 | 10/2004 | Ichimura et al. |
| 7,836,007 | B2 | 11/2010 | Beausoleil et al. |
| 10,133,986 | B1 | 11/2018 | Newton et al. |
| 10,170,680 | B2 | 1/2019 | Abraham et al. |

(Continued)

FOREIGN PATENT DOCUMENTS

| | | |
|---|---|---|
| JP | 2001-209083 A | 8/2001 |
| JP | 6066314 B2 | 1/2017 |

(Continued)

OTHER PUBLICATIONS

Karli, Y.et al., "SUPER Scheme in Action: Experimental Demonstration of Red-detuned Excitation of a Quantum Dot", arXiv:2203. 00715v1 (2022), 11 pgs.

(Continued)

*Primary Examiner* — Nghia M Doan

(74) *Attorney, Agent, or Firm* — Amin, Turocy & Watson, LLP

(57) ABSTRACT

Methods and systems for mitigating the effects of defects in a quantum processor are provided. A mitigation system includes a quantum processor having multiple qubits. The system includes an array of light emitting sources. Each light emitting source is aligned with a qubit on the quantum processor. The system includes a controller configured to receive a selection of a qubit and to enable a light emitting source from the array of light emitting sources to emit light to the selected qubit. The light is use to scramble strongly coupled two-level systems (TLSs) in the quantum processor.

25 Claims, 8 Drawing Sheets

Front View

Qubit processor

Side View

(56) References Cited

U.S. PATENT DOCUMENTS

| | | | |
|---|---|---|---|
| 10,170,681 B1 | 1/2019 | Rosenblatt et al. | |
| 10,572,815 B2 | 2/2020 | Barends | |
| 10,956,827 B2 | 3/2021 | Li | |
| 10,962,610 B2 | 3/2021 | Ibrahim et al. | |
| 11,086,191 B2 | 8/2021 | Hall et al. | |
| 11,112,842 B1 * | 9/2021 | Smith | G06N 10/40 |
| 11,120,360 B2 | 9/2021 | Kim et al. | |
| 11,195,117 B2 | 12/2021 | Monroe et al. | |
| 11,695,417 B1 | 7/2023 | Winik et al. | |
| 12,499,382 B2 * | 12/2025 | Balakrishnan | G02B 5/201 |
| 2003/0016907 A1 | 1/2003 | Locascio et al. | |
| 2009/0169071 A1 * | 7/2009 | Bond | G06V 40/13 |
| | | | 257/E33.059 |
| 2018/0161923 A1 | 6/2018 | Matsumoto et al. | |
| 2018/0366915 A1 | 12/2018 | Zilkie et al. | |
| 2019/0131511 A1 | 5/2019 | Clarke et al. | |
| 2021/0117845 A1 * | 4/2021 | Choi | G06N 10/40 |
| 2021/0258079 A1 | 8/2021 | Lauer et al. | |
| 2021/0272007 A1 * | 9/2021 | Fatemi | G06N 10/40 |
| 2021/0280764 A1 | 9/2021 | Topaloglu et al. | |
| 2021/0337171 A1 | 10/2021 | Saffman et al. | |
| 2023/0289400 A1 | 9/2023 | Carroll et al. | |
| 2024/0127095 A1 | 4/2024 | Balakrishnan et al. | |
| 2024/0127097 A1 | 4/2024 | Falk et al. | |

FOREIGN PATENT DOCUMENTS

| | | | |
|---|---|---|---|
| WO | 2018231241 A1 | 12/2018 | |
| WO | 2020236574 A1 | 11/2020 | |

OTHER PUBLICATIONS

International Search Report and Written issued Nov. 9, 2023 in related International Patent Application No. PCT/IB2023/058902, 10 pgs.

Non-Final Rejection Mailed on May 6, 2025 for U.S. Appl. No. 18/046,467, 12 page(s).

List of IBM Patents or Patent Applications Treated as Related, 2 pgs.

Lecocq, F. et al, "Control and Readout of a Superconducting Qubit Using a Photonic Link", arXiv:2009.01167v1 [quant-ph] (2020); 13 pgs.

Meesala, S. et al., "Effects of Laser Illumination on Superconducting Circuits for Quantum Transduction", CLEO Conference Proceeding (2021); 2 pgs.

Mirhosseini, M. et al., "Superconducting Qubit to Optical Photon Transduction", Nature (2020), vol. 588, pp. 15 pgs.

Hertzberg, J. B. et al., "Laser-annealing Josephson junctions for yielding scaled-up superconducting quantum processors", arXiv:2009.00781v4 (2020), 16 pgs.

Schweber, B., "MEMS Array Forms Controllable, All-Optical Photonic Switch Matrix", Electronic Design (2019), 6 pgs.

International Search Report and Written Opinion issued Dec. 13, 2023 in related application No. PCT/IB2023/058917, 13 pgs.

Anonymous, "Autler-Townes effect", Wikipedia (2022), 7 pgs.

Carroll, M. et al., "Dynamics of superconducting qubit relaxation times", arXiv:2105.15201v1 (2021); 10 pgs.

Zhao, P. et al., "Combating fluctuations in relaxation times of fixed-frequency transmon qubits with microwave-dressed states", arXiv:2203.07857v2 (2022), 12 pgs.

International Search Report and Written Opinion issued Dec. 13, 2023 is related application No. PCT/IB2023/058916, 12 pgs.

Non-Final Rejection Mailed on Jul. 10, 2025 for U.S. Appl. No. 18/046,470, 9 page(s).

* cited by examiner

100

Quantum Processor

QUBIT-SELECTIVE TUNING OF TWO-LEVEL SYSTEM IN SUPERCONDUCTING QUBITS VIA OPTICAL CONTROL

BACKGROUND

Technical Field

The present disclosure generally relates to quantum computing, and more specifically, to qubit-selective tuning via optical control.

Description of the Related Arts

A quantum bit, or qubit, is the basic element for information encoding in a quantum computer. A two-level system, or TLS, is a spurious quantum system that can couple to a qubit and cause decoherence. TLSs are one of the main sources of decoherence in superconducting quantum circuits. Typically, the TLSs consist of two sets: a large set of low frequency two level fluctuators (a bath) and a few discrete two-level systems that are near resonant with the qubit transition. If a TLS strongly interacts with a qubit, the qubit becomes inoperable due to frequency shifts and decoherence.

The nature of these TLSs is not fully understood but are believed to originate from crystal defects, surface defects, or atomic level defects in the materials that generate microscopic dipoles (atomic or electron traps) that interact with a qubit (e.g., couple to the electric fields of the qubit). The TLSs are always present and randomly distributed.

Two-level systems can be either off-resonant or on-resonant with the qubit. On-resonant TLSs are much more detrimental than off-resonant TLSs. These on-resonant, strongly coupled TLS, have a significant detrimental effect on gate fidelities in the processor. This is especially true for processors based on fixed frequency qubits.

SUMMARY

Some embodiments of the disclosure provide methods and systems for mitigating the effects of defects in a quantum processor. The system includes a quantum processor having multiple qubits. The system includes an array of light emitting sources. In some embodiments, the light emitting sources are used to scramble two-level systems (TLSs) in the quantum processor. Each light emitting source is aligned with a qubit on the quantum processor. The system includes a controller configured to receive a selection of a qubit and to enable a light emitting source from the array of light emitting sources to emit light to the selected qubit.

In some embodiments, the array of light emitting sources are fed by different optical sources. In some embodiments, the plurality of light emitting sources are fed by one common optical source. In some embodiments, each of the array of light emitting sources is a light emitting diode (LED). In some embodiments, each of the light emitting sources is a laser. In some embodiments, the array of light emitting sources may be provided by an array of mounted lenses connected to a plurality of optical fibers. In an embodiment that can be combined with previous embodiments, the lenses of the array of mounted lenses may be mounted on an illumination chip that is in a same package as the quantum processor. The illumination chip may be in a same refrigeration unit as the quantum processor. In some embodiments, the array of light emitting sources are provided by an array of mounted optical fibers.

In some embodiments, the system may include an optical switching matrix that distributes light pulses from an optical fiber to an array of lenses. An input of the optical switching matrix is connected to the optical fiber. Outputs of the optical switching matrix are connected to an array of optical fibers that feed the array of lenses. The system may also include a controller configured to receive a selection of a qubit and to enable the optical switching matrix to pass light pulses from the optical fiber to the light emitting source that is aligned with the selected qubit.

In some embodiments, the system may include a light emitting source and a positioning apparatus configured to physically move the light emitting source relative to the quantum processor. The system may also include a controller configured to receive a selection of a qubit and to control the positioning apparatus to move the light emitting source to a position that correspond to the selected qubit.

Two-level systems are one of the most fundamental problems in superconducting qubits, as they are the dominant source of decoherence. The capability to focus light on specific qubits may improve the coherence of qubits quickly, rather than relying on time-consuming processes such as heating the entire quantum processor.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

3

Figure 6:
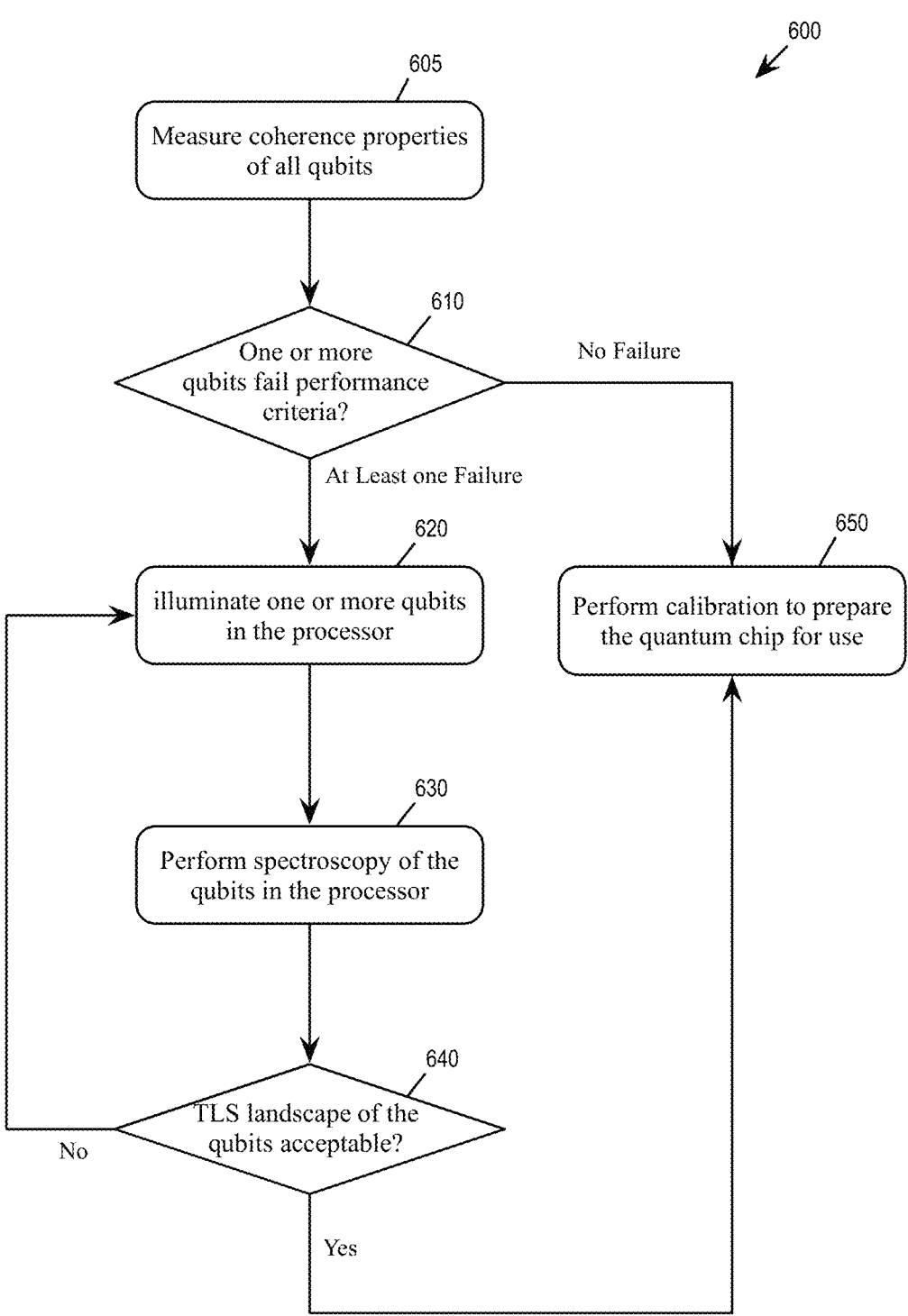

FIG. 6 conceptually illustrates a process for iteratively applying illumination to a quantum processor for eliminating strongly coupled two-level system interactions, consistent with an illustrative embodiment.

Figure 7:
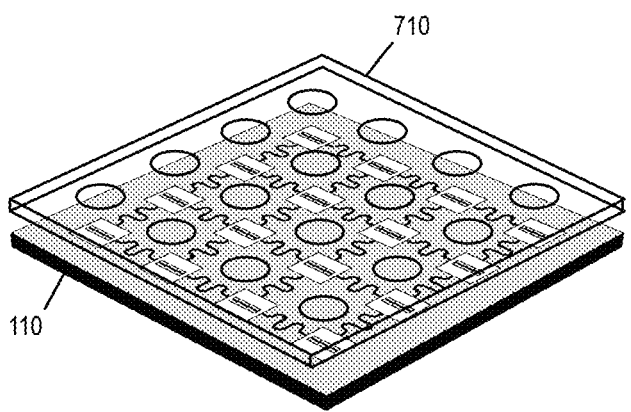

FIG. 7 illustrates multiple light emitting sources being used to illuminate the qubits of the quantum processor, with each light emitting source in the array aligned with a qubit on the quantum processor, consistent with an illustrative embodiment.

Figure 8:
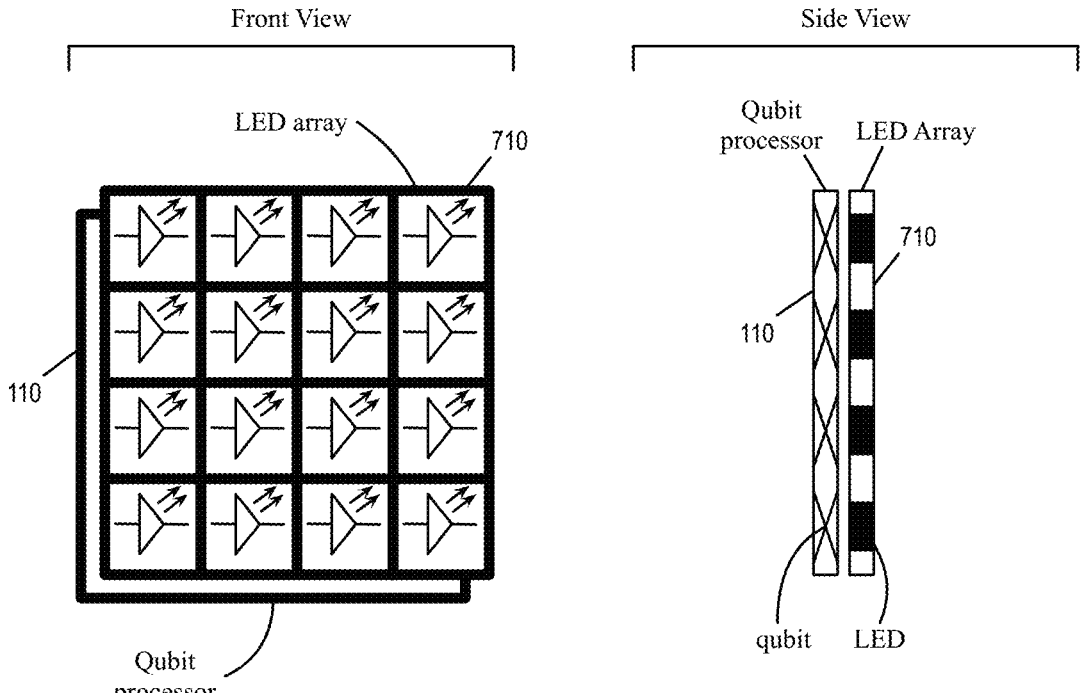

FIG. 8 shows an array of light emitting diode (LED) in the illumination chip being used to illuminate an array of qubits in the processor, consistent with an illustrative embodiment.

Figure 9:
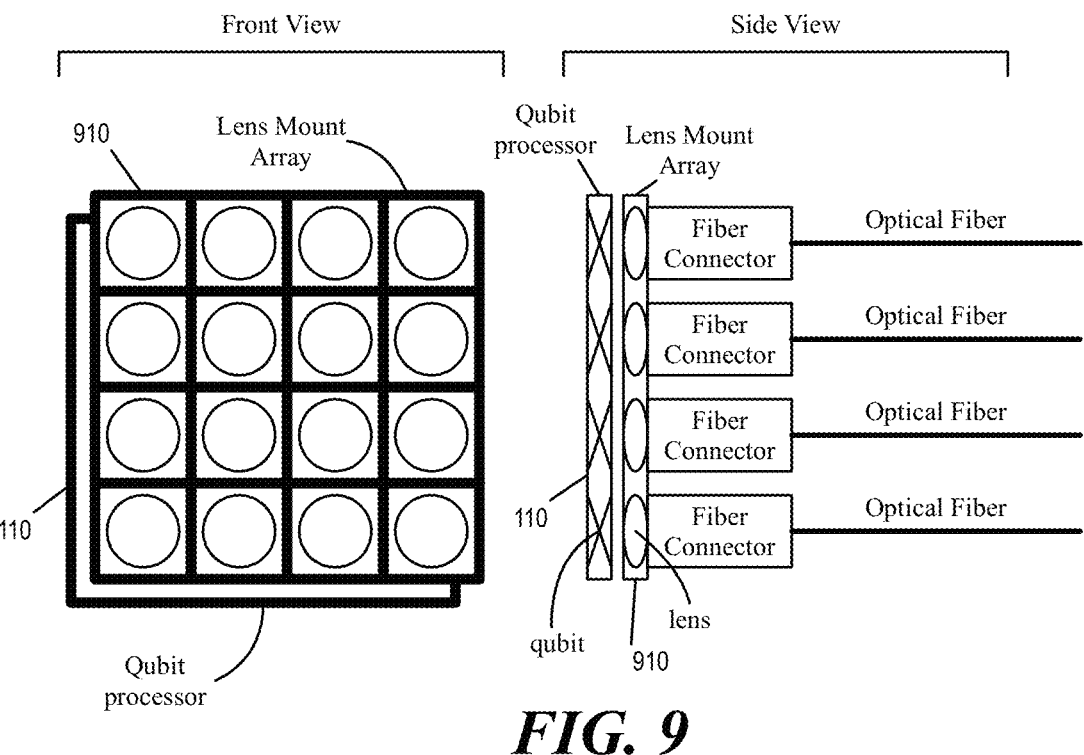

FIG. 9 shows an array of mounted lenses connected to multiple optical fibers being used to illuminate an array of qubits in the processor, consistent with an illustrative embodiment.

Figure 10:
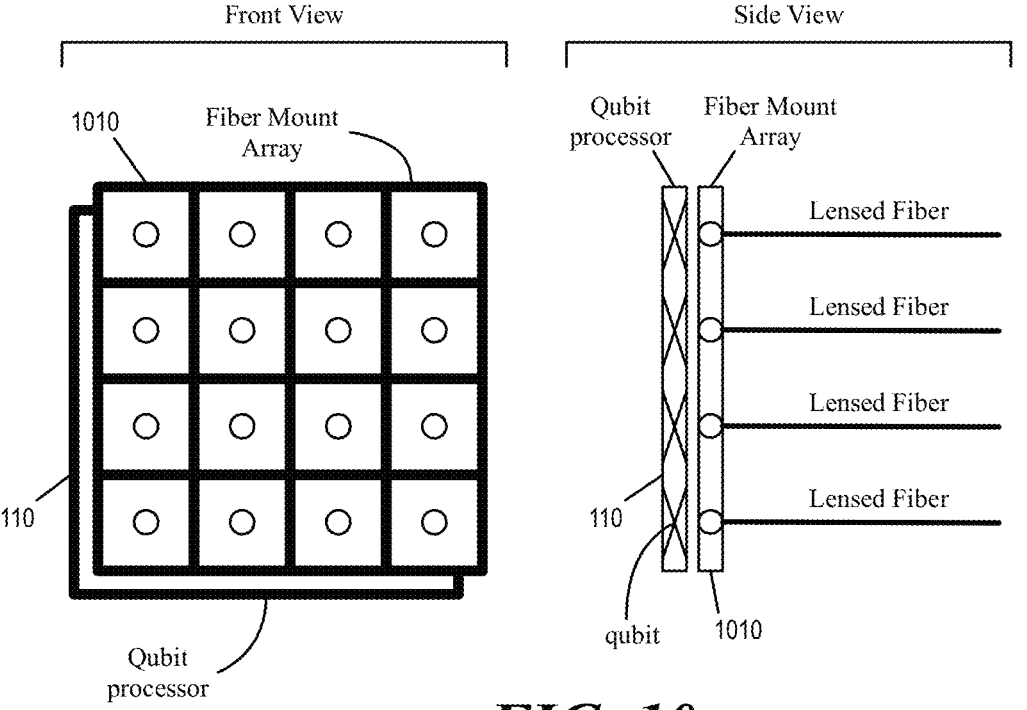

FIG. 10 shows an array of mounted optical fibers being used to illuminate an array of qubits in the processor, consistent with an illustrative embodiment.

Figure 11:
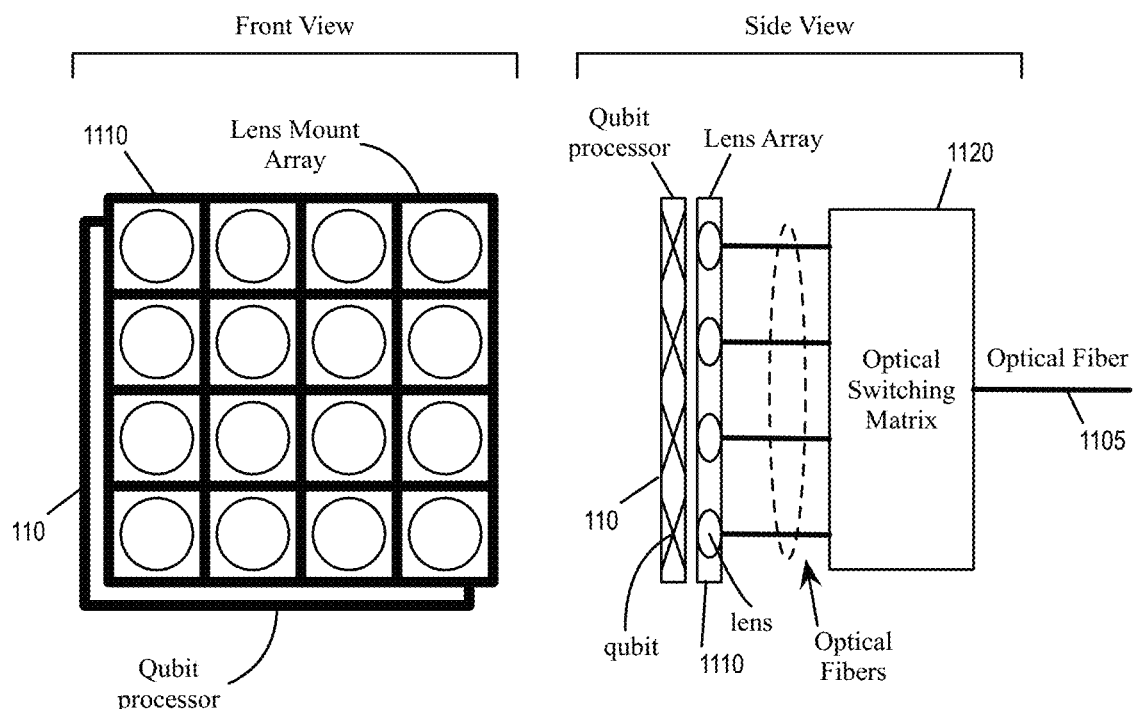

FIG. 11 shows multiple light emitting sources being fed by one common optical source to illuminate an array of qubits in the processor, consistent with an illustrative embodiment.

Figure 12:
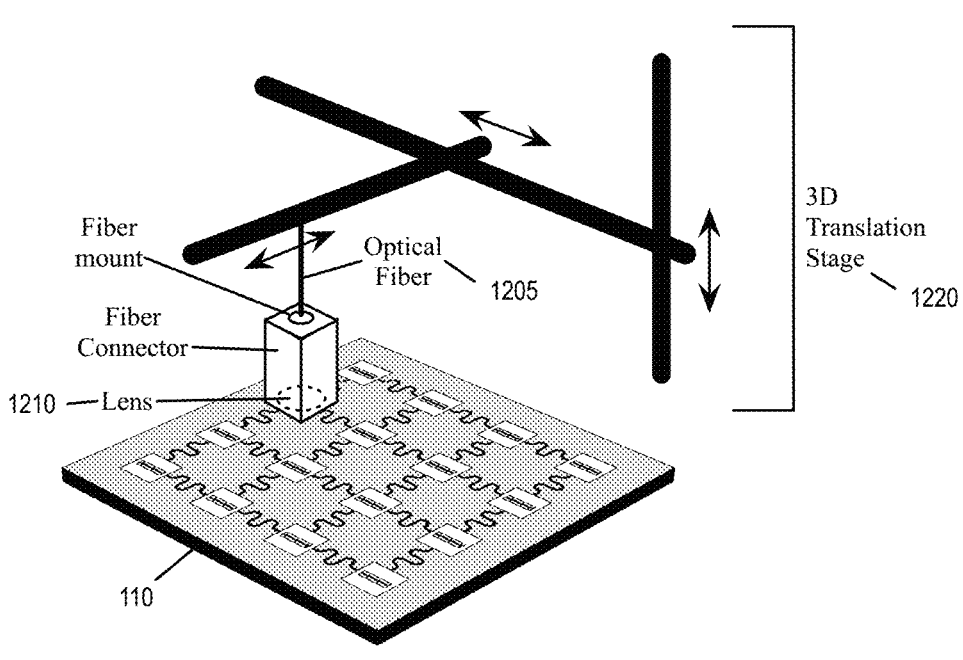

FIG. 12 illustrates a positioning apparatus being used to position a light source to illuminate a selected qubit in a quantum processor, consistent with an illustrative embodiment.

Figure 13:
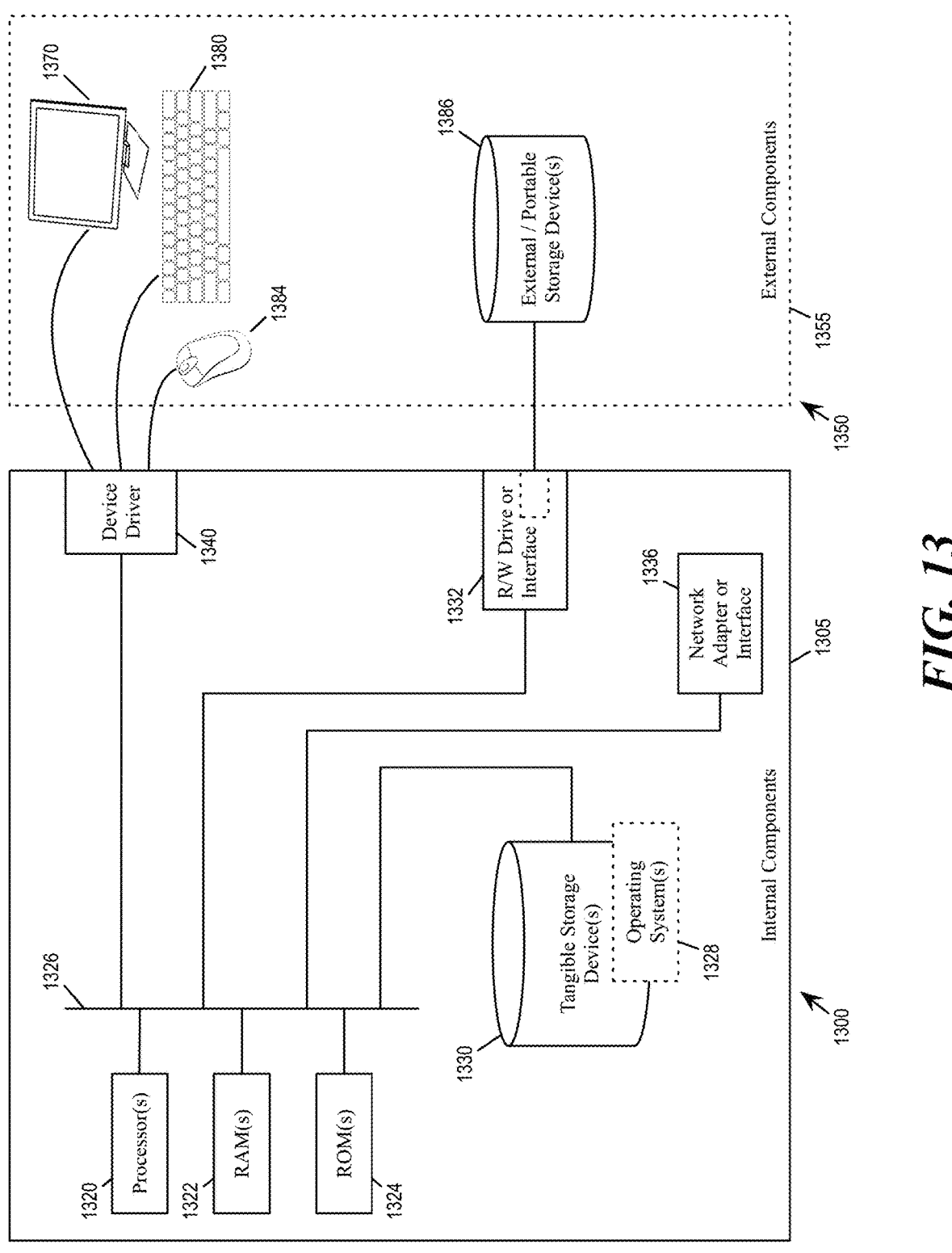

FIG. 13 shows a block diagram of the components of a data processing system in accordance with an illustrative embodiment of the present disclosure.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Because strongly coupled TLSs are significantly detrimental to qubit performance in a large quantum circuit, it is salient to develop methods to shift their frequencies to be off-resonant. TLSs are shown to be tunable in frequency by electric fields and by material strain, as TLSs tend to slowly drift in frequency (spectral diffusion) over time on a timescale of hours to days. TLS can therefore be mitigated by waiting extensively for it to diffuse. TLS can also be removed from the qubit by heating or thermal cycling the whole processor up to several Kelvin. Heating the entire processor is a very time-consuming process, as it typically takes a long time (e.g., hours) and involves full recalibration of the processor. Heating the entire processor is also a stochastic global process that cannot be used to target specific qubits. It is not certain that any specific TLS will shift frequency by the global heating. There is also a possibility that a qubit previously freed from a TLS may interact with another TLS after the heating.

Some embodiments provide methods and systems for mitigating the effects of strongly coupled two-level systems. Specifically, optical illumination is used to scramble the frequencies of the two-level systems. Scrambling TLS distributions is used to improve coherence times and to maintain stable quantum processor performance over time. The optical illumination may use telecom-frequency lights at 1310 nm and 1550 nm. In some embodiments, the optical illumination is delivered through a dilution refrigerator to a quantum processor or any array of qubits, with the light selectively focused onto individual qubits or globally applied to all qubits of the quantum processor.

Figure 1:
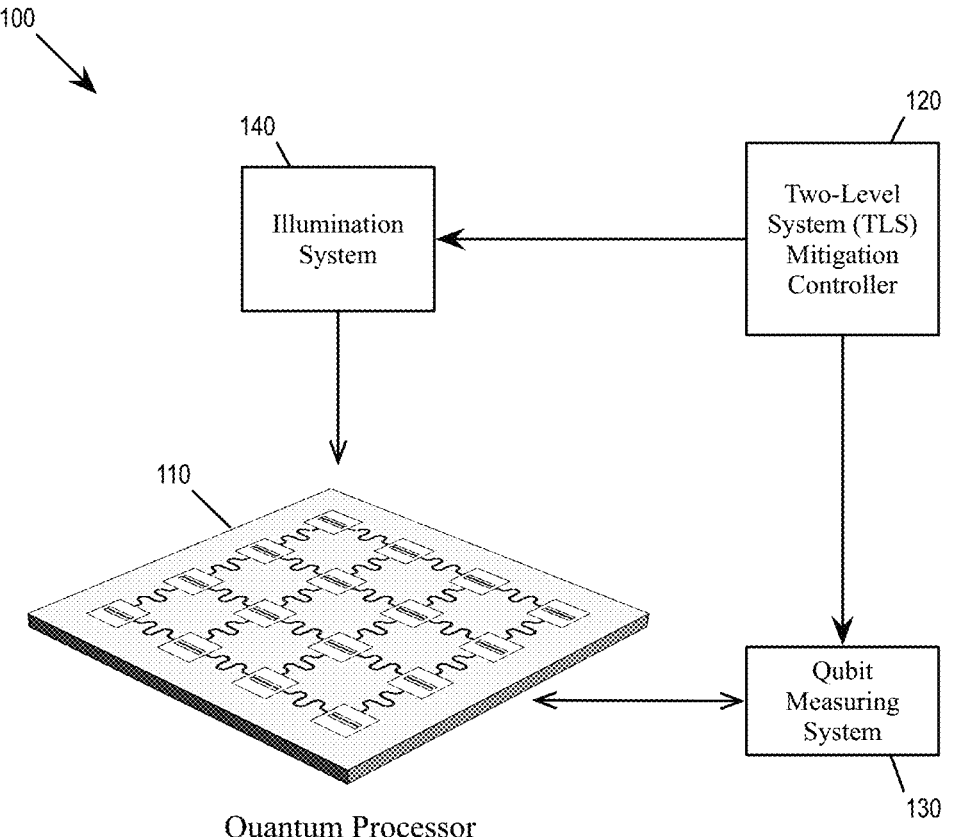
FIG. 1 illustrates a two-level system mitigation system that uses illumination to mitigate the effect of two-level systems in a quantum processor, consistent with an illustrative embodiment.

FIG. 1 illustrates a TLS mitigation system 100 that uses illumination to mitigate the effect of TLSs in a quantum processor 110. As illustrated, a TLS mitigation controller 120 controls a qubit measuring system 130 and an illumination system 140. The qubit measuring system 130 is used to detect or identify TLS in the quantum processor 110. The illumination system 140 is used to apply light to the quantum processor 110.

The measuring system 130 provide performance parameters of qubits in the quantum processor 110, including qubit decoherence time (or relaxation time) at different electric field frequencies. In some embodiments, the performance parameters of a qubit at different frequencies are captured. The mitigation controller 120 may use the captured performance parameters of a qubit to produce a spectrogram for the qubit. The spectrogram can be used as a TLS landscape to identify the frequencies at which TLSs are strongly coupled with the qubit (e.g., by identifying the frequencies at which the qubit's decoherence times are shortened by more than 25%.)

The illumination system 140 is used to provide light pulses to the quantum processor 110. The light pulses may scramble the frequency landscape of the TLSs so that the TLSs would not be strongly coupled with the qubits, e.g., becoming off-resonant so that the qubit's decoherence time is at least 75% of an ideal or expected relaxation time.

The TLS mitigation controller 120 may use the TLS landscape generated based on measurements provided by the measuring system 130 to determine when and how to apply the light pulses to the quantum processor 110 and to control the illumination system 140 accordingly.

In some embodiments, one or more laser sources are used to scramble the frequencies of TLSs. Laser pulses are used to change the TLS landscape of a superconducting quantum processor on very short time scales (e.g., less than one second). In some embodiments, very short laser pulse may be applied to instantaneously shift the TLS frequencies. The recovery time from the laser pulse is of the timescale of seconds (or less) compared to hours that may be involved for warming the whole quantum processor. The light pulses may be visible light or infrared light.

Figure 2:
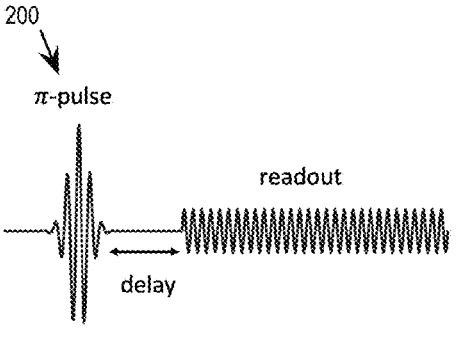
FIG. 2 illustrates a method for measuring the performance of a qubit.
Figure 2:
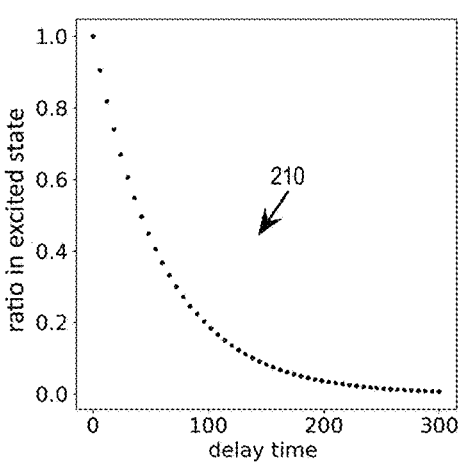

FIG. 2 conceptually illustrates a method for measuring the performance of a qubit. A microwave pulse 200 of calibrated amplitude, frequency, and duration is applied to the qubit to bring the qubit to its excited state. The state of the qubit is measured at a number of different delay times after the application of the microwave pulse. The measurements are repeated and averaged to give a characteristic exponential decay curve 210. (The vertical axis of the decay curve 210 refers to the ratio of measurements taken of the qubit in which the qubit is found to be in the excited state at a given delay time, so 1.0 correspond to finding the qubit in the excited state 100% of the measurements taken at the given delay time.) The time constant of the decay curve 210 is used to measure the performance of the qubit.

Figure 3:
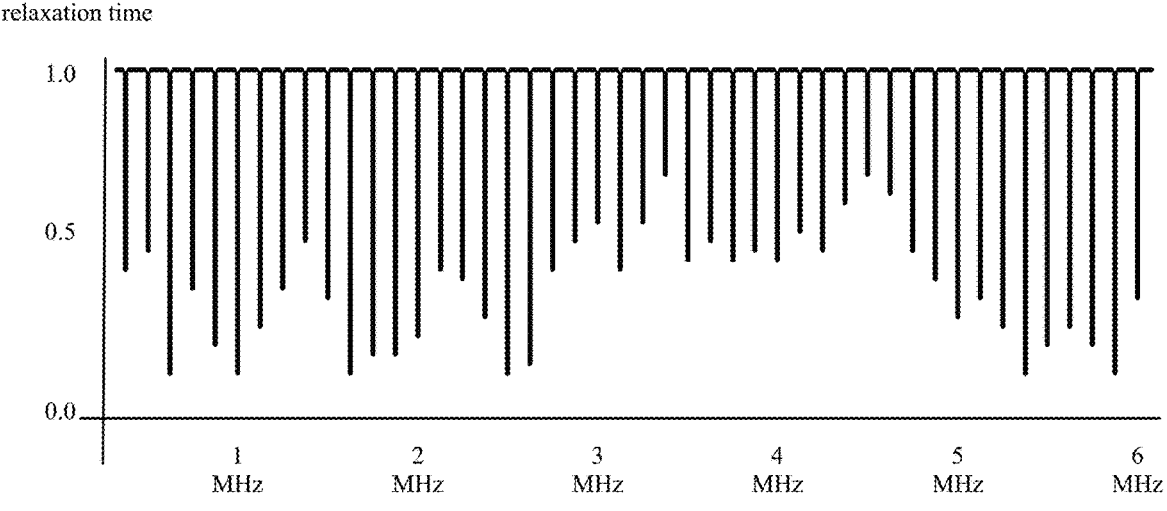
FIG. 3 shows an example two-level system landscape, consistent with an illustrative embodiment.

Defects can resonantly couple to qubits and serve as a strong energy-relaxation channel with a Lorentzian spectroscopic signature. This signature can be used to identify defects. FIG. 3 shows an example TLS landscape. The TLS landscape is based on measurement of a flux tunable quantum bit showing several regions of strongly coupled TLSs. If a fixed frequency transmon incidentally has a transition frequency in the near vicinity of a strong TLS, the qubit performance becomes severely degraded, i.e., having relaxation or decoherence times that are significantly shortened. In the figure, the measured qubit relaxation times (also referred to as Ti) are normalized with respect to an ideal or expected relaxation time. Thus, at frequencies with weak or no TLS coupling, the normalized relaxation times are near 1.0, while at frequencies with strong TLS coupling, the normalized relaxation time can drop significantly (to 0.1 or less).

Figure 4:
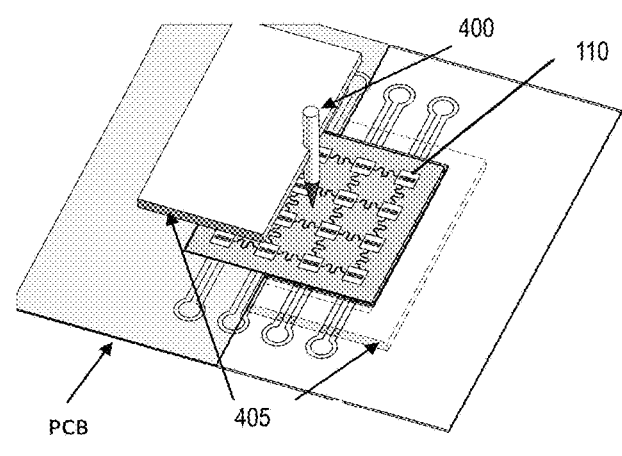
FIG. 4 shows a quantum processor having qubits that are illuminated by optical fiber, consistent with an illustrative embodiment.

FIG. 4 shows a quantum processor having qubits that are illuminated by optical fiber. The quantum processor may be built on silicon, sapphire, or other dielectric substrates. In some embodiments, a laser or optical fiber pierces the quantum processor chip to provide the illumination. As illustrated, an optical fiber 400 is attached to an enclosure 405 over the quantum processor 110. Light pulses can be guided from outside of the enclosure to illuminate part or all of the quantum processor 110. The quantum processor can be illuminated from either surface (front or back) since silicon is transparent to infrared lights with wavelength of 1100 nm or higher. Light pulses applied to the quantum processor or qubits can shift or scramble the frequency landscape of the TLS. It can be shown that, after a light pulse, TLSs may move in frequency in a random fashion. On the other hand, with no light pulse applied, TLSs may remain nearly constant over hours.

Figure 5:
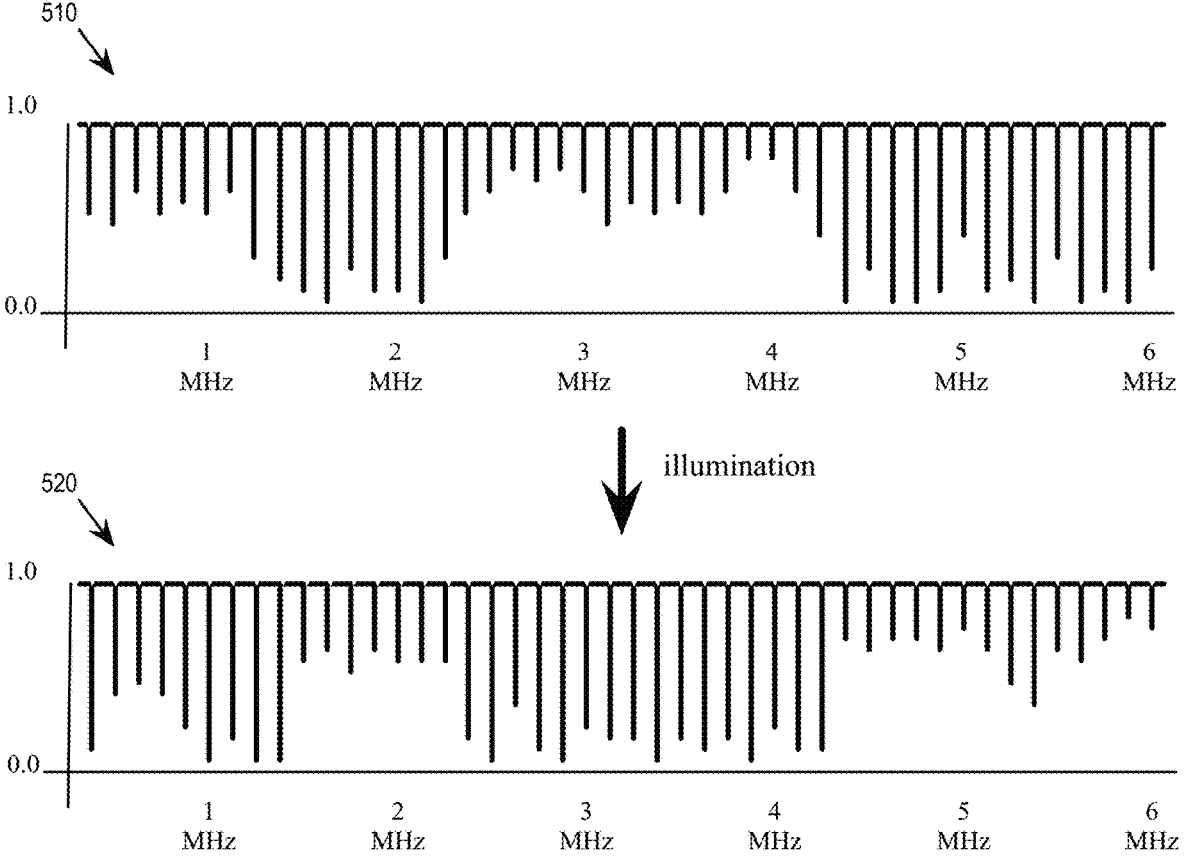
FIG. 5 shows spectrograms of a qubit in the quantum processor before and after illumination, consistent with an illustrative embodiment.

FIG. 5 shows spectrograms of a qubit in the quantum processor before and after illumination. The figure shows two spectrograms 510 and 520 that show the relaxation times of a qubit in the quantum processor at different frequencies. The first spectrogram 510 is based on measurements of the qubit taken before a light pulse is applied and the second spectrogram 520 is based on measurements of the qubit taken after the light pulse is applied. As illustrated, after the application of the light pulse, the profile of qubit relaxation times at different frequencies has shifted. This is because the TLSs in the quantum processor have been scrambled by the applied light pulse. Based on the TLS landscape as shown by the spectrogram 520, the TLS mitigation controller 120 may determine that (i) at the frequencies of interest, the TLSs would not significantly impair the operation of the qubit, or (ii) the qubit is still impaired by TLS at the frequencies of interest so that additional light pulses are needed to further scramble the TLSs. This determination may be determined by whether the relaxation time of a qubit has dropped below a particular threshold ratio (e.g., 0.75 or 75%) of an expected relaxation time.

Since the laser operation is very fast, the process of TLS frequency scrambling by laser illumination can iterate several times to find an ideal TLS configuration where all severe or strongly coupled TLS interactions has been eliminated. This will significantly improve the functioning of the quantum processor. The ability to rapidly cycle through TLS configuration and find an optimal configuration has a significant impact on the performance on any large-scale fixed frequency quantum processor.

FIG. 6 conceptually illustrates a process 600 for iteratively applying illumination to a quantum processor for eliminating strongly coupled TLS interactions, consistent with an illustrative embodiment. The TLS mitigation system 100 or the TLS mitigation controller 120 may perform the process to mitigate deleterious effects of TLSs for readying the quantum processor for use. The process rearranges the TLS landscape by rapidly cycling through TLS configurations. The properties of the qubits are measured to determine whether the scrambling by illumination could improve the processor performance. The iterative search is performed to find a good global TLS configuration across the different qubits of the quantum processor. In some embodiments, one or more processing units (e.g., processor) of a computing device implementing the TLS mitigation controller 120 perform the process 600 by executing instructions stored in a computer readable medium.

The system measures (at block 605) coherence properties of all qubits. FIG. 2 above describes an example method of measuring qubits.

The system determines (at block 610) whether one or more qubits fail performance criteria. The system may receive performance parameters (e.g., coherence properties) of one or more qubits in the quantum processor to identify a qubit that fails to meet a performance threshold. If none of the qubits fail to meet the performance criteria, the system proceeds to 650 to calibrate the quantum processor so it is ready for use. If at least one qubit fails to meet the performance criteria, the process proceeds to 620.

At block 620, the system illuminates one or more qubits in the processor. The system may apply global light pulses to the processor such that multiple qubits in the quantum processor are illuminated. The system may also use local light pulses confined to qubits that are identified as being subjected to a bad TLS interaction.

The system performs (at block 630) spectroscopy (e.g., Stark spectroscopy, which is a method to obtain a small fast frequency tuning of a quantum bit through the AC stark effect) on the qubits of processor to obtain a spectrogram as TLS landscape. The TLS landscape of a qubit is a collection of measured relaxation times of the qubit across different probe frequencies. The system receives or captures the qubit relaxation times that are measured at different qubit frequencies, including relaxation times that are measured before and after light pulses. In some embodiments, the system may perform multiple sweeps of the frequencies to obtain multiple sets of relaxation times. Since the system identifies qubits that failed the performance requirement, and the received qubit relaxation times would include relaxation times of the identified failing qubit.

The system determines (at block 640) whether the TLS landscape is acceptable, e.g., whether there is a good global TLS configuration across the different qubits of the quantum processor, or whether there is a strongly coupled TLS in the quantum processor. If the TLS landscape is acceptable, the process proceeds to 650 to calibrate the quantum processor so it is ready for use. If the TLS landscape is not acceptable, e.g., there is strong coupling between a qubit and a TLS to cause severe degradation of in decoherence time (e.g., less than 75% of the expected qubit relaxation time), the process returns to 620 to again apply laser pulses and measure qubit performances. In other words, the system applies a first light pulse to illuminate the quantum processor, then determines whether to apply a second light pulse to illuminate the quantum processor based on the current TLS configuration or landscape. This is an iterative process of applying light pulses and examining qubit relaxation times to eliminate or minimize TLS interaction with qubits.

In some embodiments, one or multiple optical fibers are used to guide the laser light from room temperature down to the chip. The focus of the laser can be manipulated to either direct all the laser power to one specific area (e.g., one specific qubit) or apply a global diffuse field (e.g., to a set of multiple qubits). In some embodiments, one or several optical fibers are integrated into a package to allow for either qubit specific or global scrambling of the TLS landscape. In some embodiments, far infrared laser light is used for chip illumination to scramble TLS where the silicon substrate is transparent.

In some embodiments, an array of light emitting sources are used to illuminate the qubits of the quantum processor. Each light emitting source in the array is aligned with a qubit on the quantum processor. FIG. 7 illustrates multiple (e.g., an array of) light emitting sources being used to illuminate the qubits of the quantum processor 110, with each light emitting source in the array aligned with a qubit on the quantum processor. The light emitting sources are in an illumination chip 710 that is in a same package as the quantum processor 110 and be placed in the same refrigeration unit (e.g., cryostat). A controller (e.g., the TLS mitigation controller 120) (not illustrated) may be configured to receive a selection of a qubit and to enable a light emitting source from the array of light emitting sources to emit light to the selected qubit.

In some embodiments, the multiple light emitting sources are fed by different optical sources. FIG. 8 shows an array of light emitting diode (LED) in the illumination chip 710 being used to illuminate an array of qubits in the processor 110. Each LED serve as the light emitting source for illuminating one corresponding qubit.

In some embodiments, the multiple light emitting sources may be provided by an array of mounted lenses connected to multiple optical fibers. FIG. 9 shows an array of mounted lenses connected to multiple optical fibers being used to illuminate an array of qubits in the processor 110. Attached to each lens mount is a lens that is coupled to an optical fiber. Incoming light from each optical fiber is focused or collimated by the corresponding lens and directed to the corresponding qubit. In some embodiments, the lenses are mounted on an illumination chip 910 that is in a same package as the quantum processor. The illumination chip 910 may be in a same refrigeration unit (e.g., a cryostat) as the quantum processor.

In some embodiments, the multiple light emitting sources are provided by an array of mounted optical fibers. FIG. 10 shows an array of mounted optical fibers 1010 being used to illuminate an array of qubits in the processor 110. Each position in the mount 1010 has a lensed optical fiber attached to it. The lensed optical fibers focus or collimate light from the fibers to the qubits on a one-to-one basis.

In some embodiments, the multiple light emitting sources being used to illuminate the individual qubits are fed by one common optical source. FIG. 11 shows multiple light emitting sources being fed by one common optical source to illuminate an array of qubits in the processor 110. As illustrated, an array of qubits is mounted by an optical fiber array mount 1110. The optical fiber array mount 1110 has an array of lenses, each lens aligned with a qubit on the quantum processor 110. In some embodiments, the array of lenses 1110 is mounted on an illumination chip that is in a same package as the quantum processor 110, and that the illumination chip is in a same refrigeration unit as the quantum processor 110.

An optical switching matrix 1120 is used to direct an incoming light source (an optical fiber 1105) to a target qubit in the array. The optical switching matrix 1120 distributes light pulses from the optical fiber 1105 to the array of lenses. The input of the optical switching matrix 1120 is connected to the optical fiber 1105 and the outputs of the optical switching matrix 1120 are connected to an array of optical fibers that feed the array of lenses 1110. In some embodiments, a controller (e.g., the mitigation controller 120) (not illustrated) may be configured to receive a selection of a qubit and to enable the optical switching matrix 1120 to pass light pulses from the optical fiber 1105 to the lens that is aligned with the selected qubit.

In some embodiments, a positioning apparatus capable of physically moving a light emitting source relative to the quantum processor is used to target illumination at a particular qubit in the processor. A controller may be configured to receive a selection of a qubit and to control the positioning apparatus to move the light emitting source to a position that correspond to the selected qubit. FIG. 12 illustrates a positioning apparatus being used to position a light source to illuminate a selected qubit in a quantum processor. As illustrated, an optical fiber 1205 attached to a lens 1210 is mounted on a 3-dimensional translation stage 1220. The lens 1210 is pointing at the qubit array 110. By manipulating the stage 1220, a qubit can be selected to be illuminated by the light pulse from the optical fiber 1205. Moreover, specific points within a single qubit can be targeted through the spatial position of the fiber/lens.

The present application may employ a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 6) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 13 shows a block diagram of the components of data processing systems 1300 and 1350 that may be used to implement the TLS mitigation controller 120 in accordance with an illustrative embodiment of the present disclosure. It should be appreciated that FIG. 13 provides only an illustration of one implementation and does not imply any limitations with regard to the environments in which different embodiments may be implemented. Many modifications to the depicted environments may be made based on design and implementation requirements.

Data processing systems 1300 and 1350 are representative of any electronic device capable of executing machine-readable program instructions. Data processing systems 1300 and 1350 may be representative of a smart phone, a computer system, PDA, or other electronic devices. Examples of computing systems, environments, and/or configurations that may represented by data processing systems 1300 and 1350 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 1300 and 1350 may include a set of internal components 1305 and a set of external components 1355 illustrated in FIG. 13. The set of internal components 1305 includes one or more processors 1320, one or more computer-readable RAMs 1322 and one or more computer-readable ROMs 1324 on one or more buses 1326, and one or more operating systems 1328 and one or more computer-readable tangible storage devices 1330. The one or more operating systems 1328 and programs such as the programs for executing the process 600 are stored on one or more computer-readable tangible storage devices 1330 for execution by one or more processors 1320 via one or more RAMs 1322 (which typically include cache memory). In the embodiment illustrated in FIG. 13, each of the computer-readable tangible storage devices 1330 is a magnetic disk storage device of an internal hard drive. Alternatively, each of the computer-readable tangible storage devices 1330 is a semiconductor storage device such as ROM 1324, EPROM, flash memory or any other computer-readable tangible storage device that can store a computer program and digital information.

The set of internal components 1305 also includes a R/W drive or interface 1332 to read from and write to one or more portable computer-readable tangible storage devices 1386 such as a CD-ROM, DVD, memory stick, magnetic tape, magnetic disk, optical disk or semiconductor storage device. The instructions for executing the process 600 can be stored on one or more of the respective portable computer-readable tangible storage devices 1386, read via the respective R/W drive or interface 1332 and loaded into the respective hard drive 1330.

The set of internal components 1305 may also include network adapters (or switch port cards) or interfaces 1336 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 1336. From the network adapters (or switch port adaptors) or interfaces 1336, the instructions and data of the described programs or processes are loaded into the respective hard drive 1330. The network may comprise copper wires, optical fibers, wireless transmission, routers, firewalls, switches, gateway computers and/or edge servers.

The set of external components 1355 can include a computer display monitor 1370, a keyboard 1380, and a computer mouse 1384. The set of external components 1355 can also include touch screens, virtual keyboards, touch pads, pointing devices, and other human interface devices. The set of internal components 1305 also includes device drivers 1340 to interface to computer display monitor 1370, keyboard 1380 and computer mouse 1384. The device drivers 1340, R/W drive or interface 1332 and network adapter or interface 1336 comprise hardware and software (stored in storage device 1330 and/or ROM 1324).

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a quantum processor comprising a plurality of qubits;
an array of light emitting sources, comprising a plurality of light emitting diodes (LEDs), respective LEDs of the array being individually addressable and disposed within a cryogenic refrigeration unit that houses the quantum processor, each LED being fixed in alignment with a respective qubit on the quantum processor such that the LEDs are configured to direct light to corresponding individual qubits; and
a controller configured to receive a selection of a qubit and to selectively enable at least one of the respective LEDs to emit light to the selected qubit for qubit state initialization or control.

2. The system of claim 1, wherein each of the array of light emitting sources is a light emitting diode (LED).

3. The system of claim 1, wherein the array of light emitting sources are provided by an array of mounted lenses connected to an array of optical fibers.

4. The system of claim 3, wherein the lenses of the array of mounted lenses are mounted on an illumination chip that is in a same package as that of the quantum processor.

5. The system of claim 4, wherein the illumination chip is in a same refrigeration unit as that of the quantum processor.

6. The system of claim 1, wherein the array of light emitting sources are provided by an array of mounted optical fibers.

7. The system of claim 1, wherein the array of light emitting sources are fed by different optical sources.

8. The system of claim 1, wherein the array of light emitting sources are fed by one common optical source.

9. The system of claim 1, wherein the light emitting sources are arranged as a two-dimensional array of light emitting sources.

10. A system comprising:
a quantum processor comprising an array of qubits;
an optical fiber configured to receive light pulses from an optical source located outside a cryogenic refrigeration environment;
an array of lenses disposed within the cryogenic refrigeration environment and packaged with the quantum processor, each lens being aligned with a corresponding qubit of the quantum processor; and
an optical switching matrix that distributes light pulses from the optical fiber to selected ones of the array of lenses such that individual qubits of the quantum processor are selectively illuminated via the corresponding aligned lenses.

11. The system of claim 10, wherein the lenses are arranged as a two-dimensional array of lenses.

12. The system of claim 10, wherein:
an input of the optical switching matrix is connected to the optical fiber; and
outputs of the optical switching matrix are connected to an array of optical fibers that feed the array of lenses.

13. The system of claim 10, wherein the lenses of the array of lenses are mounted on an illumination chip that is in a same package as that of the quantum processor.

14. The system of claim 10, wherein the illumination chip is in a same refrigeration unit as that of the quantum processor.

15. The system of claim 10, further comprising a controller configured to receive a selection of a qubit and to enable the optical switching matrix to pass light pulses from the optical fiber to the light emitting source that is aligned with the selected qubit.

16. A system comprising:
a quantum processor comprising a plurality of qubits;
a light emitting source;
a positioning apparatus configured to physically move the light emitting source relative to the quantum processor while the light emitting source and the quantum processor are disposed within a cryogenic refrigeration unit, the positioning apparatus being configured to reposition the light emitting source into alignment with different respective qubits of the quantum processor; and
a controller configured to receive a selection of a qubit and to control the positioning apparatus to move the light emitting source to a position that corresponds to the selected qubit for qubit state initialization or control.

17. The system of claim 16, wherein the positioning apparatus is configured to move the light emitting source relative to the quantum processor in three-dimensions.

18. A method comprising:
providing a quantum processor comprising a plurality of qubits;
disposing an array of light emitting sources within a cryogenic refrigeration environment and aligning respective light emitting sources of the array with corresponding qubits on the quantum processor such that each light emitting source is configured to illuminate a respective qubit; and receiving a selection of a qubit by a controller; and enabling, by the controller, the light emitting source corresponding to the selected qubit to emit light directed to the selected qubit to induce a quantum state transition.

19. The method of claim 18, wherein each of the array of light emitting sources is a light emitting diode (LED).

20. The method of claim 18, wherein the array of light emitting sources are provided by an array of mounted lenses connected to an array of optical fibers.

21. The method of claim 20, wherein the lenses of the array of mounted lenses are mounted on an illumination chip that is in a same package as that of the quantum processor.

22. The method of claim 21, wherein the illumination chip is in a same refrigeration unit as that of the quantum processor.

23. The method of claim 18, wherein the array of light emitting sources are provided by an array of mounted optical fibers.

24. The method of claim 18, wherein the array of light emitting sources are fed by different optical sources.

25. The method of claim 18, wherein the array of light emitting sources are fed by one common optical source.

* * * * *